United States Patent [19]
Carpini et al.

[11] Patent Number: 6,062,606
[45] Date of Patent: May 16, 2000

[54] QUICK-CONNECT COUPLING MECHANISM

[75] Inventors: Joseph Delli Carpini, Tampa; Donald Hambrick, Land O'Lakes, both of Fla.

[73] Assignee: PepsiCo, Inc., Purchase, N.Y.

[21] Appl. No.: 09/070,787

[22] Filed: May 1, 1998

[51] Int. Cl.[7] ................................................. F16L 35/00
[52] U.S. Cl. .......................... 285/38; 285/316; 285/93; 285/423
[58] Field of Search ............................... 285/26, 29, 308, 285/38, 315, 93, 316, 423, 340

[56] References Cited

U.S. PATENT DOCUMENTS

| | | |
|---|---|---|
| 2,722,399 | 11/1955 | Oetiker . |
| 3,167,335 | 1/1965 | Maisch . |
| 3,386,754 | 6/1968 | Morrison . |
| 3,425,717 | 2/1969 | Bruce .................................. 285/340 X |
| 3,527,480 | 9/1970 | Larson ................................ 285/316 X |
| 3,655,225 | 4/1972 | Major . |
| 3,779,586 | 12/1973 | Rossiter .............................. 285/316 X |
| 4,039,209 | 8/1977 | Goodlaxson et al. ............... 285/316 X |
| 4,458,719 | 7/1984 | Strybel . |
| 4,612,952 | 9/1986 | Fallon . |
| 4,616,859 | 10/1986 | Brunet . |
| 4,759,572 | 7/1988 | Richardson . |
| 5,092,364 | 3/1992 | Mullins . |
| 5,238,221 | 8/1993 | Schwaderer et al. . |

*Primary Examiner*—Dave W. Arola
*Attorney, Agent, or Firm*—Fitzpatrick, Cella, Harper & Scinto

[57] ABSTRACT

A fluid coupling includes a first member for supplying fluid, a second member for receiving the fluid supplied by said first member, and a securing device for securing the first member in fluid communication with the second member. The securing device includes a locking element movable between a first position at which the first and second members can be separated and a second position at which the first member is secured to the second member. An actuator is provided for moving the locking element between the first and second positions. The actuator includes a main body secured to the first member and an actuator arm movably connected to the main body for manipulating the locking element. A guiding surface is provided on the actuator body for guiding the locking element between the first and second positions.

44 Claims, 2 Drawing Sheets

QUICK-CONNECT COUPLING MECHANISM

BACKGROUND OF THE INVENTION

1. Field of the Invention

The present invention relates to a quick-connect coupling mechanism. In particular, the invention relates to a quick-connect coupling for fluid conduits and an actuator for the coupling.

2. Description of The Related Art

A number of quick-connect fluid couplings are known in the art. Typically, a male member is coupled to an opening in a female member with a locking sleeve. The locking sleeve is slidable on the female member and biased towards the end having the opening by a spring. A ball detent is positioned in a notch in the female member and can register with a complementary notch in the male member. A shoulder of the locking sleeve engages the outer edge of the ball detent to maintain it in the notches of both the male and female members when those members are fully engaged to lock them together. A recess in the locking sleeve is positioned to register with the ball detent when the locking sleeve is moved away from the male member, thereby allowing the ball detent to move out of the notch in the male member. The female member may then be disconnected from the male member. The procedure is reversed when coupling the two members.

However, such a quick-connect coupling mechanism is most effectively manipulated with the use of two hands when coupling and uncoupling. One hand is used to hold the female member while the fingers of the other hand are used to slide the locking sleeve away from the opening of the female member against the action of the spring. If the male member is not rigidly fixed, oftentimes a third hand is necessary to position the male member within the female member.

Such quick-connect coupling mechanisms are used in bottling plants in filling soft drink syrup containers, for example. An operator may manipulate the quick-connect mechanism hundreds of times a day to fill the containers. Such repeated use of the conventional quick-connect coupling mechanism can cause an operator's hands to become cramped and sore even after a short period of time. In addition, because the manipulation is essentially at least a two step process (positioning the male and female members and manipulating the locking ring) requiring two hands, production is slowed down.

Prior methods to actuate quick-connect coupling devices have been proposed. U.S. Pat. No. 3,779,586 relates to a hose coupling connect and disconnect mechanism in a hydraulic system. A typical hose coupling mechanism is modified to include an actuator mechanism. The actuator mechanism includes a pair of semi-cylindrical clamping elements that are locked onto the periphery of the locking sleeve of the female member of the coupling mechanism and a pair of lever elements are pivotally connected to the clamping elements. The lever elements are pivotable about a fixed point relative to the female member. When an operator grasps and squeezes the lever elements, the lever elements move in a direction coaxial to the longitudinal direction of the female member. This causes the clamping elements and the locking sleeve to move in the same direction, releasing the ball detents to allow the male member to be connected to or disconnected from the female member. The bodies of the lever elements can be curved or contoured to fit the operator's hand.

However, in the aforementioned patent there is no guide associated with the lever elements or the clamping elements and if the lever elements are not moved synchronously, the locking sleeve may cant and not move easily. Further, because the lever elements are not rigidly fixed to the female member, it may be difficult to surely position the female member onto the male member with a single hand of the operator.

U.S. Pat. No. 3,386,754 relates to a hose coupling connect and disconnect mechanism for use on a tractor. The mechanism includes a lever with a bifurcated lower end portion. When the lever is manually operated, a female coupling half is moved relative to a sleeve so that a ball detent is moved to release the male coupling half. However, the coupling mechanism is supported on a supporting bracket, which is supported on the tractor. Although the lever can be operated by hand, the entire coupling is not intended to be grasped by the operator.

U.S. Pat. No. 4,458,719 relates to a quick coupler service fitting in which a spring-biased latch finger of a lever connected to the male end engages with a groove on the female end. However, such a design lacks the advantages and effectiveness of using ball detents and a locking sleeve.

BRIEF SUMMARY OF THE INVENTION

While the above described devices have been generally satisfactory for their intended uses, it is an object of the present invention to provide an improved quick-connect coupling device, which is simple in construction, yet provides quick and sure coupling.

Another object of the present invention is to provide a quick-connect coupling device that can be easily manipulated and positioned with one hand of an operator.

Yet another object of the present invention is to provide a quick-connect coupling device that is designed ergonomically so as not to adversely affect an operator even after repeated use.

A still further object of the present invention is to provide an actuator that can be attached to existing quick-connect coupling devices.

An even further object of the present invention is to provide an actuator that can simply and effectively manipulate existing quick-connect coupling devices.

According to one aspect of the present invention, a fluid coupling includes first and second members, a securing device and an actuator. The first member supplies fluid and the second member receives the fluid supplied by the first member. The securing device secures the first member in fluid communication with the second member, the securing device including a locking element movable between a first position at which the first and second members are separable and a second position at which the first member is secured to the second member. The actuator moves the locking element between the first and second positions. The actuator comprises a main body secured to-the first or second member and an actuator arm movably connected to the main body for manipulating the locking element. The main body includes a guiding surface for guiding the locking element between the first and second positions.

According to another aspect of the present invention, an actuator is provided for a coupling including first and second members telescopically lockable by a securing device. The securing device includes a locking sleeve longitudinally movable to and from a locking position. The actuator includes a main body and an actuator arm. The main body is secured to the first member. The actuator arm is movably connected to the main body for manipulating the locking sleeve. The main body includes a guiding surface for guiding the locking sleeve to and from the locking position.

According to a further aspect of the present invention, a fluid coupling includes first and second members, securing means, and actuating means. The first member supplies fluid and the second member receives the fluid supplied by the first member. The securing means secures the first member in fluid communication with the second member, the securing device including locking means movable between a first position at which the first and second members are separable and a second position at which the first member is secured to the second member. The actuating means moves the locking means between the first and second positions, the actuating means including a main body secured to the first or second member, and manipulating means movably connected to the main body for manipulating the locking means. The main body includes a guiding surface for guiding the locking means between the first and second positions.

According to yet another aspect of the present invention, an actuator is provided for a coupling including first and second members telescopically lockable by a securing device. The securing device includes a locking sleeve longitudinally movable to and from a locking position. The actuator includes gripping means and actuating means. The gripping means is secured to the first member for grasping by an operator. The actuating means is movably connected to the gripping means for actuating the locking sleeve. The gripping means includes a guiding surface for guiding the locking sleeve to and from the locking position.

The above, and other objects, features and advantages of the present invention will be apparent from the following detailed description of an illustrative embodiment thereof, which is to be read in connection with the accompanying drawings wherein:

DETAILED DESCRIPTION OF THE INVENTION

Figure 1:
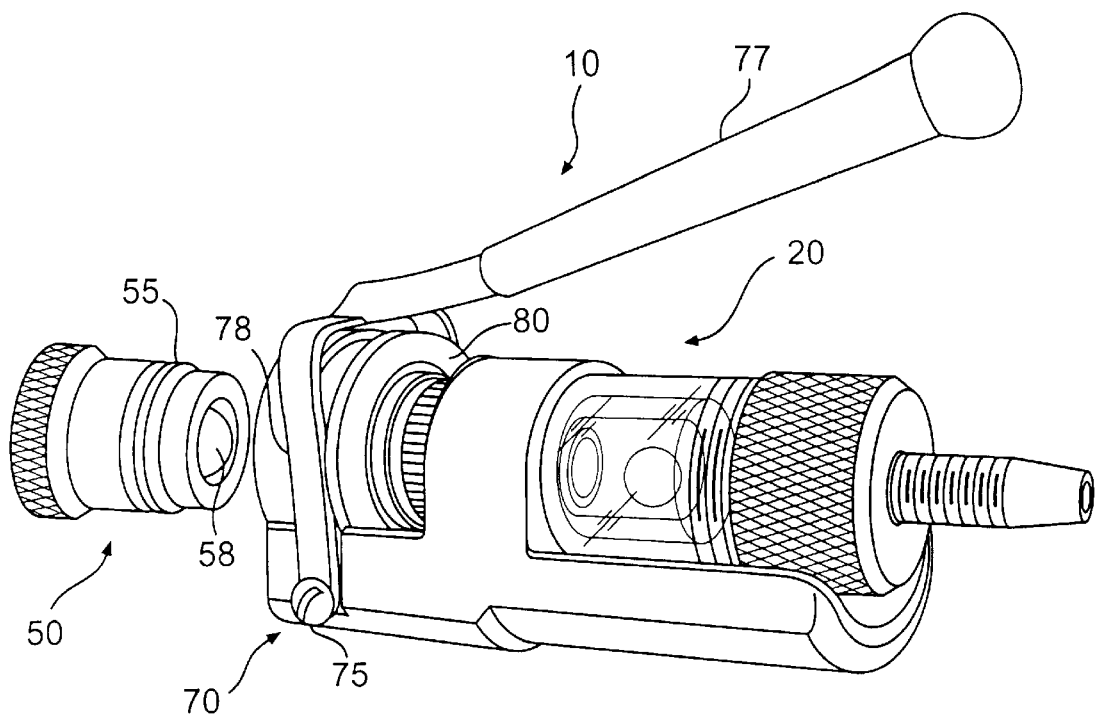
FIG. 1 is a perspective view of the quick-connect coupling mechanism of the present invention.

Referring now to the drawings in detail, and initially to FIG. 1 thereof, the quick connect coupling mechanism 10 constructed in accordance with the present invention is illustrated.

The coupling mechanism includes a female coupling member 20, a male coupling member 50, and an actuator 70. In a preferred application, female coupling member 20 is connected to a supply hose (not shown) and male coupling member 50 is used as a fitting of a container to be filled.

Figure 2:
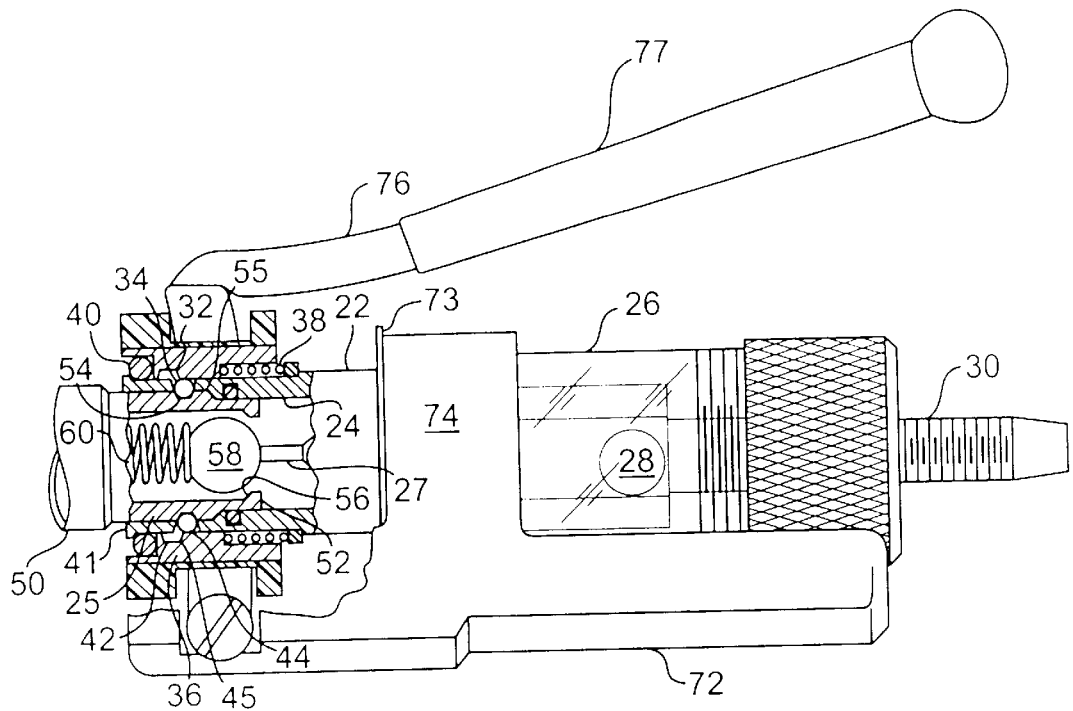
FIG. 2 is a partial cross-sectional view of the quick-connect coupling mechanism of the present invention in its connect position.
Figure 3:
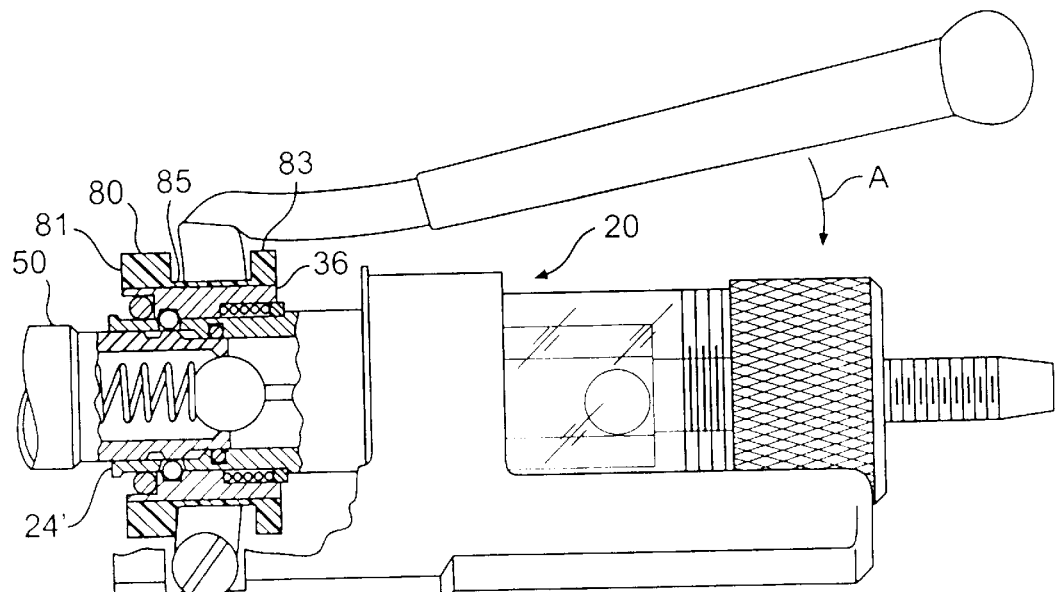
FIG. 3 is a partial cross-sectional view of the quick-connect coupling mechanism of the present invention in its disconnect position.

As shown in FIGS. 2 and 3, female coupling member 20 includes a housing 22 having a recess 24 into which male coupling member 50 can be received. A shoulder 25 is formed in the recess 24 to define a stop for insertion of the male member 50. Housing 22 of female coupling member 20 can include a spring-loaded valve (not shown) to ensure no fluid leaks from the female end when the quick-connect mechanism is disconnected. The valve can be opened by applying pressure to actuating pin 27. When pressed, the actuating pin 27 unseats the unshown valve to allow fluid communication. Such valve actuation is well-known and forms no part of the invention. Housing 22 can further include a transparent central body 26 encasing an indicator ball 28. Movement of the indicator ball 28 indicates flow of the fluid. Female member 20 also is provided with a hose attachment nipple 30 for connection to the supply hose (not shown).

Recess 24 opens at a coupling end 24' of the female member; it includes a series of ball detents 32 that fit into notches 34 in housing 22. Notches 34 are formed of a diameter less than the diameter of the ball detents 32 such that the ball detents can only partially protrude into the recess 24. A locking sleeve 36 is disposed to surround the coupling end of housing 22. Locking sleeve 36 has an inner diameter slightly larger than the outer diameter of housing 22. Locking sleeve 36 also is movable between a retracted position and an extended position and is spring-biased by spring 38 to the extended position toward the coupling end, as seen in FIG. 2. Sleeve 36 is prevented from slipping off the coupling end by a locking ring 40 and shoulder 41 formed in housing 22. Locking sleeve 36 further includes an inner recessed groove 42 that can register with notches 34 of female member housing 22 when the locking sleeve 36 is at its retracted position against the bias of the spring 38, as seen in FIG. 3.

When the recessed groove 42 of locking sleeve 36 aligns with notches 34 of housing 22, ball detents 32 are free to move in a radially outward direction relative to the longitudinal axis of housing 22. When locking sleeve 36 is in its extended position biased by spring 38, a shoulder 44 of the locking sleeve is urged against the ball detents 34 to maintain them at their radially inner extent (see FIG. 2). A transition ramp surface 45 is provided between the surface of groove 42 and the surface of shoulder 44.

Male coupling member 50 includes a coupling end 52 having an annular recess 54 and a valve seat 56 for seating a normally-closed valve 58 biased by spring 60. When male coupling member 50 is not coupled with female coupling member 20, valve 58 is seated against valve seat 56 to prevent leakage of any fluid. Male coupling member 50 also includes a shoulder 55 for abutting the shoulder 25 of the female coupling member 20.

When female coupling member 20 is to be coupled with male coupling member 50, locking ring 36 is moved to its retracted position to allow the ball detents 32 to move radially outwardly. Female coupling member 20 is then concentrically placed over male coupling member 50. When shoulder 55 of male coupling member 50 abuts against shoulder 25 of female coupling member 20, the annular recess 54 of male coupling member 50 registers with the corresponding notches 34 in female coupling member 20. When locking sleeve 36 is released, spring 38 urges the locking sleeve towards its extended position and shoulder 44 of the locking ring forces ball detents 32 radially inwardly. The ball detents 32 then register within both the notches 34 of the female coupling member and the annular recess 54 of the male coupling member to lock them together.

When female coupling member 20 is placed over male coupling member 50, valve pin 27 of the female coupling member contacts ball valve 58 of the male coupling member so that both valves are lifted off of their respective valve seats as is known in the art. Thus, the flow passages of male connecting member 50 and female connecting member 20 are in open fluid communication. Fluid can then be supplied from a source through the hose connected to the female coupling member, through the male coupling member and into the container.

In a typical quick-connect coupling mechanism, an operator first grasps the body of the female coupling member with one hand and grasps the locking sleeve with another to move the locking ring relative to the female coupling member. This two-handed operation can be eliminated with the use of the actuator mechanism 70 of the present invention.

Actuator mechanism 70 includes an actuator body 72 formed of molded plastic, for example. The body 72 is connected to the housing of the female connector member 20 with an integral central ring portion 74 which can be formed with an inner diameter in tight tolerance to the outer diameter of housing 22 so as to enable a friction fit. One or more locking rings can also be provided to secure the connection. For example, a metal C-ring 73 is snapped into an unshown groove of housing 22 and abuts an edge of central ring portion 74. This further prevents relative movement of actuator body 72 and female connector member 20.

The body 72 of the actuator mechanism 70 can be formed in various sizes so as to be attachable to different-sized female coupling members. Although the actuator mechanism is described herein as being attachable to the female coupling member 20, it is also within the scope of this invention to form the housing of the female connector member integrally with the body 72 of the actuator mechanism 70.

Lever 76 is pivotally connected to the actuator body 72 and preferably includes as a lever handle 77 with bifurcated legs 78 (FIG. 1). Lever handle 77 and its bifurcated legs 78 are preferably disposed at an angle slightly greater than a right angle. The pivotal connection between lever 76 and actuator body 72 is made at the ends of bifurcated legs 78 with screws 79, for example.

A spool-shaped actuator ring 80 is secured to a locking ring 36 by a friction fit, for example. Actuator ring 80 can also be formed integrally with the locking ring 36. The actuator ring 80 includes two spaced annular shoulders 81, 83 defining central annular groove 85 therebetween. Groove 85 is dimensioned to have a width slightly wider than the width of the legs 78 of lever 76. Central groove 85 receives legs 78 of lever 76 with no fixed connection. Thus, legs 78 can abut one of the annular shoulders of the actuator ring 80 yet move tangentially relative to the periphery of the actuator ring 80.

When lever arm 77 is pivoted to move downwardly toward the female connector member 20 and the actuator main body 70 as shown by the arrow A in FIG. 3, the bifurcated legs 78 pivot about the pivot point at screws 75 in a clockwise direction. Because there is no fixed connection between the central groove of actuator ring 80 and bifurcated legs 78, the rotational movement of the bifurcated legs is translated into linear movement of actuator sleeve 80 by abutment therewith. Linear movement of actuator ring 80 results in linear movement of locking sleeve 36 towards the right as viewed in FIGS. 2 and 3. The length of lever 76 provides a mechanical advantage when moving locking sleeve 36 against the action of the spring 38.

Figure 4:
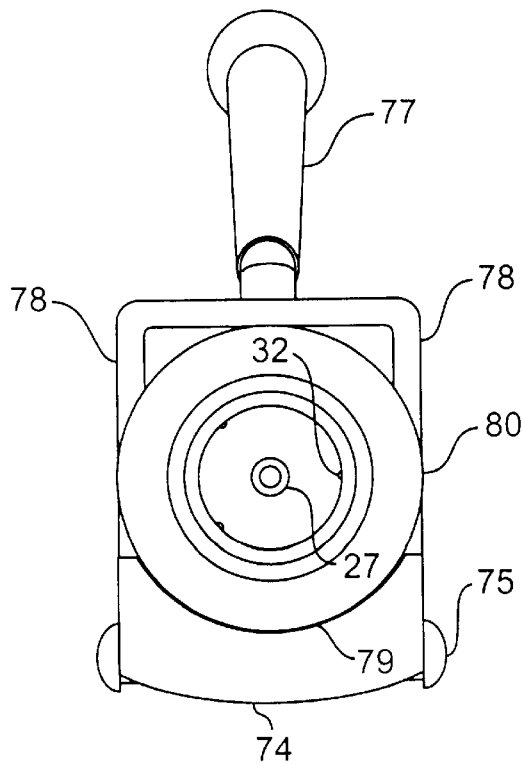
FIG. 4 is a bottom view of the female end of the quick-connect coupling mechanism of the present invention.

This linear movement of actuator ring 80 is further ensured by concave guiding surface 79 formed on the inside surface of the actuator main body 70. As shown in FIG. 4, this guiding surface 79 is formed as an arc with substantially the same diameter as the outer diameter of actuator ring 80. At least one of the actuator ring 80 and the guiding surface 77 can be formed of or coated with a self-lubricating material to ensure smooth motion of actuator ring 80.

With the above arrangement, when an operator grasps the quick-connect coupling mechanism, the palm of the operator's hand will rest against the smooth surface of the main body 70 of the actuator mechanism and the operator's fingers will wrap around lever arm 77. Thus, with one hand the female coupling member 20 of the quick-connect mechanism can be positioned onto the male coupling member 50. Further, by gently clenching that hand, the actuator mechanism 70 moves locking ring 36 from its extended position to its retracted position such that the female coupling member can be connected or disconnected with ease. Minimal force is needed to move locking ring 36 against the spring force of spring 38 because of the mechanical advantage of lever 76. When the operator's grasp is released, spring 38 will urge the locking ring to its extended position, thus moving the actuator ring 80 and urging lever arm 77 to its rest position. Because of the ergonomic design and mechanical advantage of the quick-connect mechanism 10, repetitive manipulation will not fatigue or injure the operator's hand.

Although an illustrative embodiment of the present invention has been described herein in connection with the accompanying drawings, it is to be understood that this invention is not limited to that precise embodiment and that various changes and modifications may be effected therein by those skilled in the art without departing from the spirit of the invention.

What is claimed is:

1. A fluid coupling comprising:

a first member for supplying fluid;

a second member for receiving the fluid supplied by said first member;

a securing device for securing said first member in fluid communication with said second member, said securing device comprising a locking sleeve movable between a first position at which said first and second members are separable and a second position at which said first member is securable to said second member by said locking sleeve urging a locking element into engagement with said first and second members; and an actuator for moving said locking sleeve between the first and second positions, said actuator comprising a main body secured to one of said first and second members and an actuator arm movably connected to said main body for manipulating said locking sleeve, wherein said main body includes a guiding surface for guiding said locking sleeve between the first and second positions, said guiding surface engaging and guiding an exterior periphery of said locking sleeve.

2. A fluid coupling according to claim 1, wherein said actuator arm comprises a lever having one end pivotally connected to said main body.

3. A fluid coupling according to claim 2, wherein said main body has a smooth outer surface for grasping along with said lever by one hand of an operator.

4. A fluid coupling according to claim 2, wherein said guiding surface of said main body is disposed adjacent the end of said lever pivotally connected to said main body.

5. A fluid coupling according to claim 1, wherein said locking element of said securing device comprises a ball detent movably disposed within said first member to an engaging position for engaging with a complementary recess in said second member, said ball detent being held in the engaging position by said locking element when said locking element is at the second position.

6. A fluid coupling according to claim 1, wherein said actuator further comprises an actuator ring fixedly surrounding said locking sleeve.

7. A fluid coupling according to claim 6, wherein said guiding surface of said main body of said actuator comprises a concave surface complementary to and in sliding contact with the periphery of said actuator ring.

8. A fluid coupling according to claim 6, wherein said actuator ring has a spool-like shape with two annular shoulders disposed on either side of a central groove, said actuator arm including bifurcated legs fitted in the central groove of said actuator ring to abut said annular shoulders.

9. A fluid coupling according to claim 8, wherein when said actuator arm is moved, said bifurcated legs rotate about a pivot point, an edge of each of said bifurcated legs abutting against an edge of one of said annular shoulders of said actuator ring to urge said actuator ring in a linear direction.

10. A fluid coupling according to claim 1, wherein said main body of said actuator is secured to said first member by a friction fit.

11. A fluid coupling according to claim 1, wherein said first member comprises a female member and said second member comprises a male member.

12. An actuator for a coupling including first and second members telescopically lockable by a securing device, the securing device including a locking sleeve longitudinally movable to and from a locking position where the locking sleeve urges a locking element into engagement with the first and second members, said actuator comprising:

a main body secured to the first member; and an actuator arm movably connected to said main body for manipulating the locking sleeve, wherein said main body comprises a guiding surface for guiding the locking sleeve to and from the locking position, said guiding surface engaging and guiding an exterior periphery of the locking sleeve.

13. An actuator according to claim 12, wherein said actuator arm comprises a lever having one end pivotally connected to said main body.

14. An actuator according to claim 13, wherein said main body has a smooth outer surface for grasping along with said lever by one hand of an operator.

15. An actuator according to claim 13, wherein said guiding surface of said main body is disposed adjacent the end of said lever pivotally connected to said main body.

16. An actuator according to claim 12, wherein said locking element of said securing device comprises a ball detent movably disposed within said first member to an engaging position for engaging with a complementary recess in said second member, said ball detent being held in the engaging position by said locking sleeve when said locking sleeve is at the locking position.

17. An actuator according to claim 12, further comprising an actuator ring fixedly surrounding the locking sleeve.

18. An actuator according to claim 17, wherein said guiding surface of said main body comprises a concave surface complementary to and in sliding contact with the periphery of said actuator ring.

19. An actuator according to claim 17, wherein said actuator ring has a spool-like shape with two annular shoulders disposed on either side of a central groove, said actuator arm including bifurcated legs fitted in the central groove of said actuator ring to abut said annular shoulders.

20. An actuator according to claim 19, wherein when said actuator arm is moved, said bifurcated legs rotate about a pivot point, an edge of each of said bifurcated legs abutting against an edge of one of said annular shoulders of said actuator ring to urge said actuator ring in a linear direction.

21. An actuator according to claim 12, wherein said main body is secured to the first member by a friction fit.

22. An actuator according to claim 12, wherein the first member comprises a female member and the second member comprises a male member.

23. A fluid coupling comprising:

a first member for supplying fluid;

a second member for receiving the fluid supplied by said first member;

securing means for securing said first member in fluid communication with said second member, said securing means comprising locking means for moving between a first position at which said first and second members are separable and a second position at which said first member is securable to said second member by said locking means urging a locking element into engagement with said first and second members; and actuating means for moving said locking means between the first and second positions, said actuating means comprising a main body secured to one of said first and second members, and manipulating means movably connected to said main body for manipulating said locking means, wherein said main body includes a guiding surface for guiding said locking means between the first and second positions, said guiding surface engaging and guiding an exterior periphery of said locking means.

24. A fluid coupling according to claim 23, wherein said manipulating means comprises a lever having one end pivotally connected to said main body.

25. A fluid coupling according to claim 24, wherein said main body has a smooth outer surface for grasping along with said lever by one hand of an operator.

26. A fluid coupling according to claim 24, wherein said guiding surface of said main body is disposed adjacent the end of said lever pivotally connected to said main body.

27. A fluid coupling according to claim 23, wherein said locking element of said securing means comprises a ball detent movably disposed within said first member to an engaging position for engaging with a complementary recess in said second member, said ball detent being held in the engaging position by said locking means when said locking means is at the second position.

28. A fluid coupling according to claim 23, wherein said actuating means further comprises an actuator ring fixedly surrounding said locking means.

29. A fluid coupling according to claim 28, wherein said guiding surface of said main body of said actuating means comprises a concave surface complementary to and in sliding contact with the periphery of said actuator ring.

30. A fluid coupling according to claim 28, wherein said actuator ring has a spool-like shape with two annular shoulders disposed on either side of a central groove, said manipulating means including bifurcated legs fitted in the central groove of said actuator ring to abut said annular shoulders.

31. A fluid coupling according to claim 30, wherein when said manipulating means or arm is moved, said bifurcated legs rotate about a pivot point, an edge of each of said bifurcated legs abutting against an edge of one of said annular shoulders of said actuator ring to urge said actuator ring in a linear direction.

32. A fluid coupling according to claim 23, wherein said main body of said actuating means is secured to said first member by a friction fit.

33. A fluid coupling according to claim 23, wherein said first member comprises a female member and said second member comprises a male member.

34. An actuator for a coupling including first and second members telescopically lockable by a securing device, the securing device including a locking sleeve longitudinally movable to and from a locking position where the locking sleeve urges a locking element into engagement with the first and second members, said actuator comprising:

gripping means, secured to the first member, for grasping by an operator; and actuating means, movably connected to said gripping means, for actuating the locking sleeve, wherein said gripping means comprises a guiding surface for guiding the locking sleeve to and from the locking position, said guiding surface engaging and guiding an exterior periphery of said locking sleeve.

35. An actuator according to claim 34, wherein said actuating means comprises a lever having one end pivotally connected to said gripping means.

36. An actuator according to claim 35, wherein said gripping means has a smooth outer surface for grasping along with said actuating means by one hand of the operator.

37. An actuator according to claim 35, wherein said guiding surface of said gripping means is disposed adjacent the end of said lever pivotally connected to said gripping means.

38. An actuator according to claim 34, wherein the locking element of the securing device comprises a ball detent movably disposed within the first member to an engaging position for engaging with a complementary recess in the second member, the ball detent being held in the engaging position by the locking sleeve when the locking sleeve is at the locking position.

39. An actuator according to claim 34, further comprising an actuator ring fixedly surrounding the locking sleeve.

40. An actuator according to claim 39, wherein said guiding surface of said gripping means comprises a concave surface complementary to and in sliding contact with the outer periphery of said actuator ring.

41. An actuator according to claim 39, wherein said actuator ring has a spool-like shape with two annular shoulders disposed on either side of a central groove, said actuating means including bifurcated legs fitted in the central groove of said actuator ring to abut said annular shoulders.

42. An actuator according to claim 41, wherein when said actuating means is moved, said bifurcated legs rotate about a pivot point, an edge of each of said bifurcated legs abutting against an edge of one of said annular shoulders of said actuator ring to urge said actuator ring in a linear direction.

43. An actuator according to claim 34, wherein said gripping means is secured to the first member by a friction fit.

44. An actuator according to claim 34, wherein the first member comprises a female member and the second member comprises a male member.

* * * * *